United States Patent
Teranishi et al.

[11] 3,921,406
[45] Nov. 25, 1975

[54] STEAM POWER GENERATOR APPARATUS OF THE REGENERATIVE CYCLE TYPE

[75] Inventors: Tsugutomo Teranishi; Yoshiyuki Amano, both of Hitachi, Japan

[73] Assignee: Hitachi, Ltd., Japan

[22] Filed: May 14, 1974

[21] Appl. No.: 469,877

[30] Foreign Application Priority Data
June 15, 1973   Japan.................................. 48-66902

[52] U.S. Cl.................................... 60/660; 60/678
[51] Int. Cl.²........................ F01K 7/04; F01K 7/40
[58] Field of Search ............ 60/660, 678, 665, 667, 60/652

[56] References Cited
UNITED STATES PATENTS
3,457,725   7/1969   Schwarzenbach ..................... 60/652

*Primary Examiner*—Allen M. Ostrager
*Attorney, Agent, or Firm*—Craig & Antonelli

[57] ABSTRACT

An apparatus comprising steam generator means, steam turbine means, condenser means and higher and lower pressure feed water heaters connected together to form a system through which steam and water are recirculated in a cycle. The feed water heater of the higher pressure side is connected to steam extraction lines connected to at least two expansion stages of the steam turbine means differing from each other in pressure and temperature, and control means is provided in such steam extraction lines for introducing steam extracted from the lower pressure stage of the turbine means into the feed water heater of the higher pressure side when the steam turbine means is operated under a higher load and for introducing steam extracted from the higher pressure stage of the turbine means thereinto when the steam turbine means is operated under a lower load, whereby thermal efficiency can be increased when the steam turbine means operates under a partial load of 50 to 80 percent.

4 Claims, 2 Drawing Figures

STEAM POWER GENERATOR APPARATUS OF THE REGENERATIVE CYCLE TYPE

BACKGROUND OF THE INVENTION

This invention relates to steam power generator apparatus of the regenerative cycle type, and more particularly it is concerned with improvements in or relating to a heating steam system for the feed water heating means.

Heretofore, it has been customary to operate a thermal power plant such that its output is close to its rated output. Thus, advances in the progress of technology in this field have been made with a special emphasis on increasing thermal efficiency (heat rate) when the output of the plant is close to its rated output. It has therefore been common practice to design a steam turbine plant such that its thermal efficiency reaches a highest level when its output is close to the rated one. However, there has in recent years been an increasing demand for operating a steam turbine in such a manner that it produces an output which is close to its rated one only when the demand for the generation of electric power is at its peak, with the plant normally being operated under a partial load of 50 to 80 percent. Thus, the problem involved here is not how to increase thermal efficiency when the plant is operated to produce an output which is close to its rated one but how to increase thermal efficiency when it is under a partial load of 50 to 80 percent.

One of the methods of increasing thermal efficiency when the plant is under a partial load would consist in designing the plant such that the steam turbine attains its highest efficiency in the governing stage when it is under a partial load. This method does not, however, bring about a marked increase in efficiency because it relies on an improvement in internal efficiency in the governing stage.

The present invention provides means for increasing the thermal efficiency of a steam power plant when it is under a partial load which means is based on a technical concept which is distinguished over the prior art.

SUMMARY OF THE INVENTION

An object of the invention is to provide a steam power generator apparatus of the so-called regenerative cycle using a feed water heating system wherein its thermal efficiency is increased when it is under a partial load by providing improvements in the regenerative cycle under a partial load.

Another object of the invention is to accomplish the aforementioned object without appreciably increasing the cost of equipment.

Another object of the invention is to provide a steam power generator apparatus of the regenerative cycle type wherein the final feed water temperature can be controlled according to the load.

Still another object of the invention is provide means to permit the aforementioned control of the final feed water temperature to be effected relatively easily.

Generally, it is well known that the thermal efficiency of a regenerative cycle can be varied greatly according to the number of stages of steam extraction and the final feed water temperature (the temperature of feed water at the inlet of the steam generator means). In actual practice, steam extraction is effected at five or six stages when the main steam pressure is about 130 kg/cm² and at six to eight stages when it is 170 kg/cm² with a view to operating the plant economically. It is also well known that the optimum level of the final feed water temperature may vary depending on the number of stages of steam extraction from the point of view of thermal efficiency. Generally, the final feed water temperature level is set at a level lower than the optimum level for the highest thermal efficiency. This is largely because the volume of steam required for heating feed water must be increased and the consumption of steam by the steam turbine increases if the final feed water temperature is set at a higher level, thereby making it necessary to increase the capacity of steam generator means and feed water supply means. This has the disadvantages of increasing the cost of equipment and renders the plant uneconomical.

The present invention aims at increasing the thermal efficiency of a regenerative cycle when it is under a partial load without rendering it uneconomical to operate under a maximum load. According to the invention, there is provided an economical steam power generator apparatus which is operated at a relatively low final feed water temperature when it is under a higher load in order to reduce the consumption of steam, and which is operated, when under a partial load, by increasing the final feed water temperature to a level which is close to the optimum level at the partial load, whereby thermal efficiency can be increased when the apparatus is under a partial load without increasing the cost of equipment.

The outstanding characteristics of the invention are as follows which enable the steam power generator apparatus of the regenerative cycle comprising steam generator means, steam turbine means and higher pressure and lower pressure feed water heaters connected in series with one another to operate as aforementioned. One of them is that the feed water heater of the higher pressure side is connected to steam extraction lines connected to at least two expansion stages of the steam turbine means differing from each other in pressure, whereby steam extracted from the lower pressure stage is introduced into the higher pressure side feed water heater when the steam turbine means is operated under a higher load and steam extracted from the higher pressure stage is introduced thereinto when the steam turbine means is operated under a lower load. Another characteristic is that the feed water heater of the lower pressure side is connected to steam extraction lines connected to at least two expansion stages of the steam turbine means differing from each other in pressure and disposed at the lower pressure side than the aforementioned at least two expansion stages of the steam turbine means, whereby steam extracted from the lower pressure stage is introduced into the lower pressure side feed water heater when the steam turbine means is operated under a higher load and steam extracted from the higher pressure stage is introduced thereinto when the steam turbine is operated under a lower pressure. Still another characteristic is that throttle means is provided in the steam extraction system.

Certain terminology will be used herein for convenience in reference only and will not be limiting. The term "steam extraction" will also designate "exhaust steam" emitted from the final stage of the higher pressure turbine or intermediate pressure turbine. The term "feed water heater of the higher pressure side" will designate a feed water heater which is disposed in a position nearer to the steam generator means and which is essentially the highest pressure feed water heater. The term "feed water heater of the lower pressure side" will designate a feed water heater which is disposed in a position nearer to the condenser means and which is a feed water heater lower in pressure by one stage than the highest pressure feed water heater when more than three feed water heaters are employed.

Extraction of steam of higher pressure and extraction of steam of, lower pressure side can be switched between each other by using suitable change-over means. It should be understood that the position in which switching is effected can be selected as desired and that mixing of the steam of higher pressure to the steam of lower pressure may occur to a certain extent without departing from the spirit of the invention.

DESCRIPTION OF THE PREFERRED EMBODIMENTS

Figure 1:
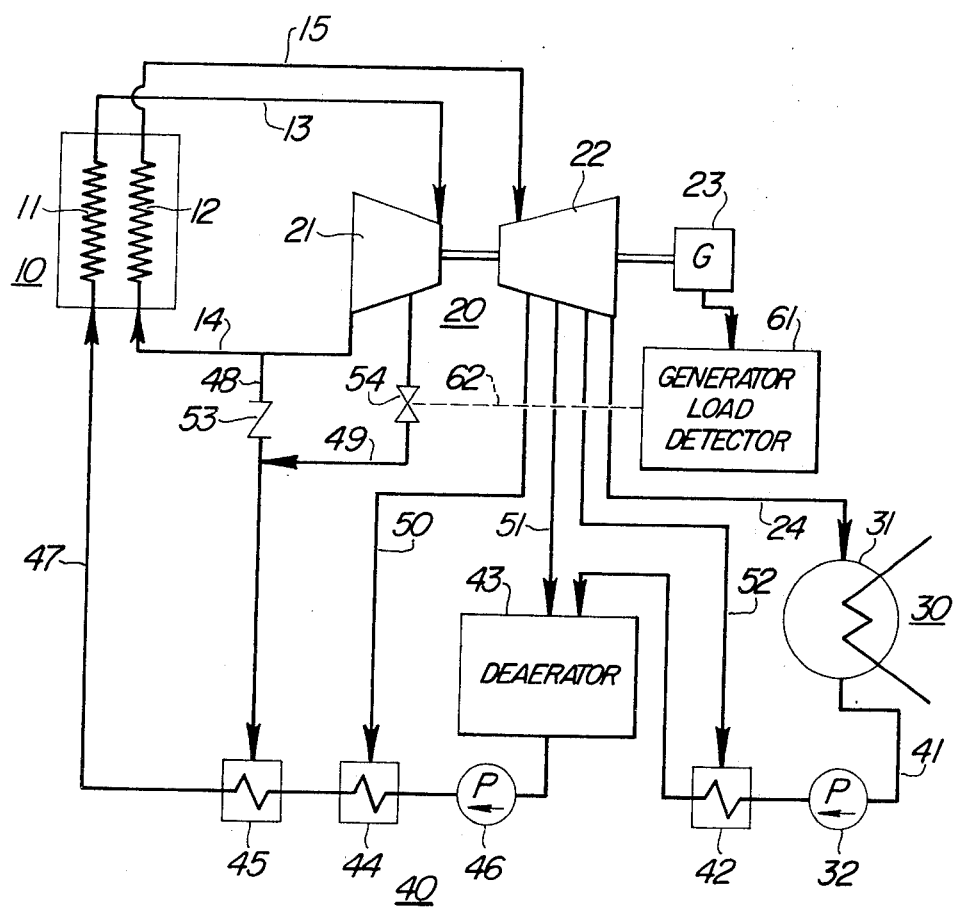
FIG. 1 is a systematic diagram of one embodiment of the invention, showing the arrangement of various parts connected together by piping.

FIG. 1 shows a steam turbine power plant comprising steam generator means 10, steam turbo-generator 20, condenser means 30 and feed water heating means 40. The steam generator means 10 comprises an evaporator 11 in which steam is evolved. The steam is passed through a main steam line 13 to a higher pressure turbine 21 where it does work. After having done work, the steam is passed through a lower temperature reheating steam line 14 to reheater 12 where it is reheated. The reheated steam is passed through a higher temperature reheating steam line 15 to a reheating turbine 22 where it does work.

The higher pressure turbine 21 and reheating turbine 22 are interconnected by a shaft, and the reheating turbine 22 has a generator 23 connected to the end of its shaft as a load. Exhaust steam vented from the reheating turbine 22 is passed through an exhaust steam line 24 to a condenser 31 where it is cooled and condensed into water. The water is supplied by a condenser pump 32 to the feed water heating means 40 which comprises as shown, feed water heaters of four stages or a lower pressure feed water heater 42, a deaerator 43 and higher pressure feed water heaters 44 and 45 connected in series with one another by a condensation line 41 and a feed water line 47. A feed water pump 46 is mounted at the outlet of the deaerator 43 to supply water to the steam generator means 10.

A higher load operation steam extraction line 48 branching off from the exhaust steam line for the higher pressure turbine 21 or the lower temperature reheating steam line 14 and a lower load operation steam extraction line 49 from the intermediate pressure stage of the higher pressure turbine 21 are connected to the higher pressure feed water heater 45, so that heating steam can be supplied thereto from two steam extraction stages differing from each other in pressure. A check valve 53 is mounted in the higher load operation steam extraction line 48 while a steam extraction change-over valve 54 is mounted in the lower load operation steam extraction line 49. Upon opening the steam extraction change-over valve 54, the check valve 53 automatically closes due to pressure differential between the streams of steam extracted through the two different lines, so that steam extracted from the intermediate stage of the higher pressure turbine 21 is supplied to the higher pressure feed water heater 45. Conversely, upon closing the steam extraction change-over valve 54, the check valve 53 automatically opens, so that steam moving through the lower temperature reheating steam line 14 is supplied to the higher pressure feed water heater 45. Steam extraction lines 50, 51 and 52 connected at one end to the reheating turbine 22 are connected at the other end to the higher pressure feed water heater 44, deaerator 43 and lower pressure feed water heater 42 respectively, so as to supply heating steam thereto.

It will thus be appreciated that if the steam extraction change-over switch 54 of the aforementioned apparatus is closed when the apparatus is operated under a higher load, then part of the exhaust steam from the higher pressure turbine 21 is supplied to the feed water heater 45, so that the temperature of water fed to the steam generator means 10 or the final feed water temperature is relatively low. Because of this, the consumption of steam is reduced and consequently the higher pressure turbine 21, steam generator means 10, feed water heaters 44, 45 and feed water pump 46 can be reduced in capacity. This is conducive to reduced equipment cost. On the other hand, by opening the steam extraction change-over switch 54 when the apparatus is operated under a partial load, steam of higher pressure is supplied from the intermediate stage of the higher pressure turbine 21 to the feed water heater 45, thereby elevating the final feed water temperature. This is conducive to increased to thermal effieiency of the regenerative cycle.

Heretofore, it has been common practice to reduce the final feed water temperature of a regenerative cycle below its optimum level for maintaining thermal efficiency at a high level. Economic consideration has weighed heavily in adopting this policy as indicated by the need to economize on equipment cost as aforementioned.

When the present invention is carried into practice, steam extraction of lower pressure is obtained from the same steam extraction point as an apparatus of the prior art when the steam turbine is operated under a higher load, so that the same thermal efficiency as the prior art can be achieved. Steam extraction of higher pressure is obtained in the apparatus according to the invention from point most suitable from the point of view of thermal efficiency when the steam turbine is operated under a partial load, thereby enabling the level of thermal efficiency of the apparatus under a partial load to be elevated to the highest level for the regenerative cycle.

Besides the aforementioned factor, an increase in the internal efficiency of the higher pressure turbine may also be a factor in the increase in thermal efficiency which can be realized by the practice of the present invention when the steam turbine is operated under a partial load. More specifically, the internal efficiency of the higher pressure turbine 21 is generally reduced as the load under which it is operated is increased, because the loss of energy due to throttling in the throttle governing stage increases under a lower load. According to the invention, steam extraction to be supplied to the final feed water heater is switched from the lower pressure side to the higher pressure side when the plant is operated under a lower load, thereby increasing the volume of steam introduced into the higher pressure turbine 21. Thus, throttle governing can be effected under conditions of higher internal efficiency attained when the plant is operated under a higher load, even if the plant is operated under a lower load. This also contriuotes to the increase in thermal efficiency when the plant according to the invention is operated under a lower load.

Figure 2:
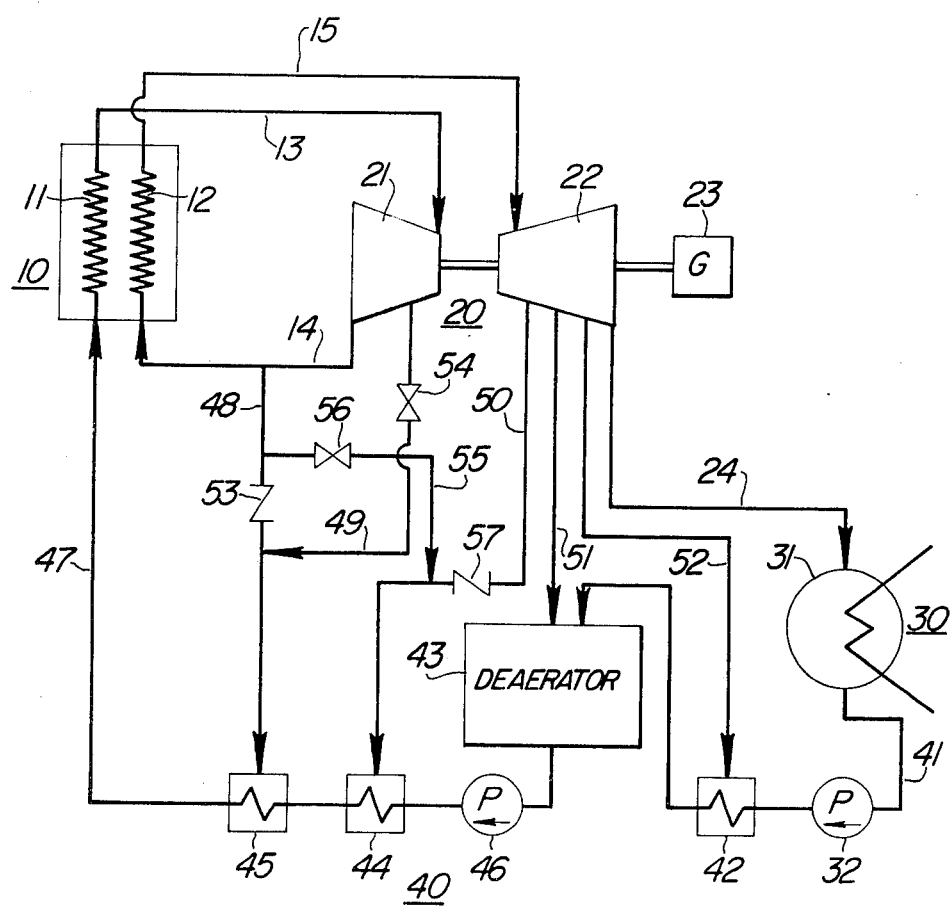
FIG. 2 is a systematic diagram of a second embodiment of the invention, showing the arrangement of various parts connected together by piping.

FIG. 2 shows a steam turbine power plant of the reheating, regenerative and condensation type comprising another embodiment of the invention based on the same concept as the plant illustrated in FIG. 1 in a systematic diagram.

The plant shown in FIG. 2 is similar to that shown in FIG. 1 except for the fact that a line 55 branching off from the higher load operation steam extration line 48 for the higher pressure feed water heater 45 is connected to a steam extraction line 50 for the higher pressure feed water heater 44, with a steam extraction change-over valve 56 being mounted in the branch line 55 and a check valve 57 being mounted in the steam extraction line 50. The steam extraction change-over valves 54, 56 are closed when the plant is operated under a higher load, so that steam extraction is supplied to the feed water heater 45 through the lower temperature reheating steam line 14 and to the feed water heater 44 from the intermediate turbine 22. Conversely, the steam extraction change-over valves 54, 56 are opened when the plant is operated under a lower load. This automatically closes the check valves 53, 57, so that steam extraction is supplied to the higher pressure feed water heater 45 from the intermediate stage of the higher pressure turbine 21 and to the higher pressure feed water heater 44 from the turbine 21 through the lower temperature reheating steam line 14.

When the invention is carried into practice as shown in FIG. 1, the temperature of feed water in the higher pressure feed water heater 45 may be elevated to an inordinately high level. When this is the case, the rise in the temperature of feed water in the higher pressure feed water heater 45 can be reduced and a uniform rise in the temperature of feed water can be obtained in all the feed water heaters by supplying steam extraction to the higher pressure feed water heater 44 of a lower pressure by one stage from the turbine 21 through the higher load operation steam extraction line 48. Thus, the thermal efficiency of the plant is higher in the case of the embodiment shown in FIG. 2 than in the case of embodiment shown in FIG. 1.

An increase in thermal efficiency which would be achieved by incorporating the present invention in a steam turbine plant of the order of 200,000 kilowatts was calculated by trial. The results show that the increase would be about 0.7 percent in the embodiment of FIG. 1 and about 1.0 percent in the embodiment of FIG. 2 when the plant is operated under a partial load or less than 85 percent of the rated load, as compared with a similar plant of the prior art.

In the embodiments shown and described, there are two steam extraction switching points. It should be understood, however, that the invention is not limited to this number of steam extraction switching points, and that the number may be three or more. Also, the invention has been described as being incorporated in a turbine of the reheating and condensation type, but it can, of course, have application in a steam turbine of the non-reheating type or of the back pressure type.

Various methods may be employed for switching between steam extraction points without departing from the spirit of the invention. For example, switching may be effected manually by the operator according to his judgment, or automatically by detecting the conditions under which a load is applied. In effecting automatic switching, the operation may be based on detection of variations in any quantity used as a variable which may be the generator load, the evaporation occurring in the steam generator means, the feed water, the degree of opening of a steam turbine steam adjusting valve, the expansion pressure of the steam turbine or the pressure of steam extraction. For example, the load of the generator 23 may be detected by a generator load detector 61 which produces detection signals for actuating the steam extraction change-over switch 54 through an electric system 62.

We claim:

1. A steam power generator of the regenerative cycle type comprising steam generator means, steam turbine means, higher pressure and lower pressure feed water heater connected in series with one another, the feed water heater of the higher pressure side being connected to steam extraction lines connected to at least two expansion stages of said steam turbine means differing from each other in pressure and temperature, and control means mounted in said steam extraction lines for effecting control such that steam extraction from the lower pressure stage of the steam turbine means is introduced into the feed water heater of the higher pressure side when the steam turbine is operated under a higher load and steam extraction from the higher pressure stage thereof is introduced thereinto when the steam turbine means is operated under a lower load.

2. A steam power generator apparatus as claimed in claim 1 wherein the feed water heater of the lower pressure side is connected to steam extraction lines connected to at least two expansion stages of said steam turbine means differing from each other and lower than said first mentioned two expansion stages of the steam turbine means in pressure, whereby steam extraction from the lower pressure stage can be introduced into the feed water heater of the lower pressure side when the steam turbine is operated under a higher load and steam extraction from the higher pressure stage can be introduced thereinto when the steam turbine means is operated under a higher load.

3. A steam power generator apparatus as claimed in claim 1 wherein a steam extraction change-over switch is mounted in each of said steam extraction line and there is provided a generator load detector which detects the generator load and produces signals for controlling said steam extraction change-over valves through an electric system.

4. A steam power generator of the regenerative cycle type comprising steam generator means, steam turbine means, and higher and lower pressure feed water heaters connected in series with one another, wherein the feed water heater of the lower pressure side is connected to steam extraction lines connected to at least two expansion stages of said steam turbine means differing from each other in pressure, the feed water heater of the higher pressure side being connected to a steam extraction line connected to a higher pressure expansion stage of said steam turbine means, whereby steam extraction is introduced into the feed water heater of the higher pressure side at a reduced pressure when the steam turbine means is operated under a higher load and steam extraction can be introduced thereinto without having its pressure substantially reduced when the steam turbine means is operated under a lower load and whereby steam extraction from the lower pressure stage can be introduced into the feed water heater of the lower pressure side when the steam turbine is operated under a higher load and steam extraction from the higher pressure stage can be introduced thereinto when the steam turbine means is operated under a lower load.

* * * * *